(12) United States Patent
Bai et al.

(10) Patent No.: US 10,966,051 B2
(45) Date of Patent: *Mar. 30, 2021

(54) SYSTEMS AND METHODS FOR PERFORMING LOCATION BASED ACTIONS

(71) Applicant: BEIJING DIDI INFINITY TECHNOLOGY AND DEVELOPMENT CO., LTD., Beijing (CN)

(72) Inventors: Jingwen Bai, Beijing (CN); Yuchu Cao, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/697,058

(22) Filed: Nov. 26, 2019

(65) Prior Publication Data

US 2020/0100053 A1  Mar. 26, 2020

Related U.S. Application Data

(63) Continuation of application No. 15/566,470, filed as application No. PCT/CN2017/084337 on May 15, 2017, now Pat. No. 10,547,965.

(30) Foreign Application Priority Data

Nov. 21, 2016 (CN) .......................... 2016 1 1042989
Dec. 9, 2016 (CN) .......................... 2016 1 1132328
Jan. 20, 2017 (CN) .......................... 2017 1 0048352

(51) Int. Cl.
*H04W 4/00* (2018.01)
*H04W 4/021* (2018.01)
(Continued)

(52) U.S. Cl.
CPC ....... *H04W 4/021* (2013.01); *H04M 1/72572* (2013.01); *H04W 4/02* (2013.01);
(Continued)

(58) Field of Classification Search
CPC ....... H04W 4/021; H04W 4/02; H04W 4/023; H04W 4/027; H04W 4/024;
(Continued)

(56) References Cited

U.S. PATENT DOCUMENTS 10,547,965 B2 *  1/2020  Bai ........................ H04W 4/023
2010/0036603 A1  2/2010  Kang
(Continued)

FOREIGN PATENT DOCUMENTS

CN    101847325 A    9/2010
CN    103376978 A   10/2013
(Continued)

OTHER PUBLICATIONS

The Extended European Search Report in European Application No. 17781378.9 dated Nov. 6, 2019, 30 pages.
(Continued)

*Primary Examiner* — Khai M Nguyen
(74) *Attorney, Agent, or Firm* — Metis IP LLC

(57) ABSTRACT

The present application discloses systems and methods for performing location-based actions. The methods may include obtaining, by an electronic device, location information associated with the electronic device with respect to a reference location. The methods may further include determining, by the electronic device, whether the location information changes from a first status to a second status. The methods may further include performing, by the electronic device, a predetermined action upon determining that the location information changes from the first status to the second status. The location information may relate to a
(Continued)

speed, a direction, an acceleration, a geographic location of the electronic device, and/or a distance between the electronic device and the reference location.

20 Claims, 10 Drawing Sheets

(51) Int. Cl.
| | | |
|---|---|---|
| *H04W 4/02* | (2018.01) | |
| *H04M 1/725* | (2021.01) | |
| *G01C 21/34* | (2006.01) | |
| *H04W 4/024* | (2018.01) | |
| *G01C 21/36* | (2006.01) | |

(52) U.S. Cl.
CPC ........... *H04W 4/023* (2013.01); *H04W 4/027* (2013.01); *G01C 21/3484* (2013.01); *G01C 21/3492* (2013.01); *G01C 21/3676* (2013.01); *H04M 2250/10* (2013.01); *H04W 4/024* (2018.02)

(58) Field of Classification Search
CPC .......... H04M 1/72572; H04M 2250/10; G01C 21/3484; G01C 21/3492; G01C 21/3676
See application file for complete search history.

(56) References Cited

U.S. PATENT DOCUMENTS

| | | |
|---|---|---|
| 2010/0094542 A1 | 4/2010 | Kang |
| 2010/0114477 A1 | 5/2010 | Yeh |
| 2011/0059693 A1 | 3/2011 | O'Sullivan |
| 2013/0158772 A1* | 6/2013 | Swenson .............. G05D 1/0278 701/25 |
| 2014/0141810 A1 | 5/2014 | Shin et al. |
| 2014/0344728 A1 | 11/2014 | Tuukkanen |
| 2015/0170134 A1 | 6/2015 | Gum |
| 2016/0029175 A1 | 1/2016 | Lau et al. |
| 2017/0257844 A1* | 9/2017 | Miller ............... H04M 1/72569 |
| 2017/0293950 A1* | 10/2017 | Rathod .............. G06Q 30/0639 |

FOREIGN PATENT DOCUMENTS

| | | |
|---|---|---|
| CN | 104075729 A | 10/2014 |
| CN | 104866522 A | 8/2015 |
| CN | 104931064 A | 9/2015 |
| CN | 105139643 A | 12/2015 |
| CN | 102510478 B | 1/2016 |
| CN | 105404929 A | 3/2016 |
| CN | 103903428 B | 5/2018 |
| TW | 201205513 A1 | 2/2012 |
| TW | 201346220 A1 | 11/2013 |

OTHER PUBLICATIONS

International Search Report in PCT/CN2017/084337 dated Jul. 23, 2017; 4 pages.
Written Opinion in PCT/CN2017/084337 dated Jul. 28, 2017, 4 pages.
Examination Report in Australian Application No. 2017265121 dated Jun. 5, 2013, 6 pages.
Győző Gidófalvi, Spatio-Temporal Data Mining for Location-Based Services, 2007, 209 pages.
The Second Office Action in Chinese Application No. 201611132328.4 dated Apr. 20, 2020, 16 pages.

* cited by examiner

SYSTEMS AND METHODS FOR PERFORMING LOCATION BASED ACTIONS

CROSS-REFERENCE TO RELATED APPLICATIONS

This application is a continuation of U.S. patent application Ser. No. 15/566,470, filed on Oct. 13, 2017, which is a U.S. national stage under 35 U.S.C. § 371 of International Application No. PCT/CN2017/084337, filed on May 15, 2017, which claims priority to Chinese Application No. 201611042989.8 filed on Nov. 21, 2016, Chinese Application No. 201611132328.4 filed on Dec. 9, 2016, Chinese Application No. 201710048352.8 filed on Jan. 20, 2017, the contents of which are incorporated herein by reference.

TECHNICAL FIELD

The present disclosure generally relates to systems and methods for performing actions, and more particularly, to systems and methods for performing location-based actions on a mobile terminal for an on-demand service.

BACKGROUND

With the development of Internet technology, on-demand services, such as online taxi hailing services and delivery services, have become more and more popular. Conventionally, a service provider may have to spend time and energy to identify an unfamiliarly target (e.g., a location of a service requester or the service requester him/her self). Thus, it may be desirable to develop systems and methods that provide a reminder for the service provider to identify the target quickly and efficiently.

SUMMARY

According to an aspect of the present disclosure, a system may include an electronic device. The electronic device may include at least one storage medium and at least one processor configured to communicate with the at least one storage medium. The storage medium may include a set of instructions for switching operation mode based on status change. When the processor executing the set of instructions, the processor may be directed to perform one or more of the following operations. The processor may obtain location information associated with the electronic device with respect to a reference location. The processor may determine whether the location information changes from a first status to a second status. Upon determining that the location information changes from the first status to the second status, the processor may perform a predetermined action.

In some embodiments, the location information may include a distance between the electronic device and the reference location. The first status may include the distance being longer than a threshold distance. The second status may include the distance being shorter than the threshold distance.

In some embodiments, the location information may include a distance between the electronic device and the reference location. The first status may include the distance being shorter than a threshold distance. The second status may include the distance being longer than the threshold distance.

In some embodiments, the location information may include a speed of the electronic device. The first status may include the speed being shorter than a threshold speed. The second status may include the speed being faster than the threshold speed.

In some embodiments, the location information may include a speed of the electronic device. The first status may include the speed being faster than a threshold speed. The second status may include the speed being shorter than the threshold speed.

In some embodiments, the processor may further display a map under a perspective view. The predetermined action may include changing from displaying the map under the perspective view to displaying the map under a plan view.

In some embodiments, the processor may further display a map under a perspective view. The predetermined action may include obtaining recommendation information around the reference location, and displaying and/or highlighting the recommendation information on the map.

In some embodiments, the processor may further generate a vibration, a light, or a sound. The predetermined action may include changing strength and/or frequency of the vibration, the light or the sound.

According to a further aspect of the present disclosure, a method may include one or more of the following operations. An electronic device may obtain location information associated with the electronic device with respect to a reference location. The electronic device may determine whether the location information changes from a first status to a second status. Upon determining that the location information changes from the first status to the second status, the electronic device may perform a predetermined action.

According to another aspect of the present disclosure, a non-transitory machine-readable storage medium may include instructions. When the non-transitory machine-readable storage medium is accessed by an electronic device, the instructions may direct the electronic device to perform one or more of the following operations. The instructions may cause the electronic device to obtain location information associated with the electronic device with respect to a reference location. The instructions may cause the electronic device to determine whether the location information changes from a first status to a second status. Upon determining that the location information changes from the first status to the second status, the instructions may cause the electronic device to perform a predetermined action.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
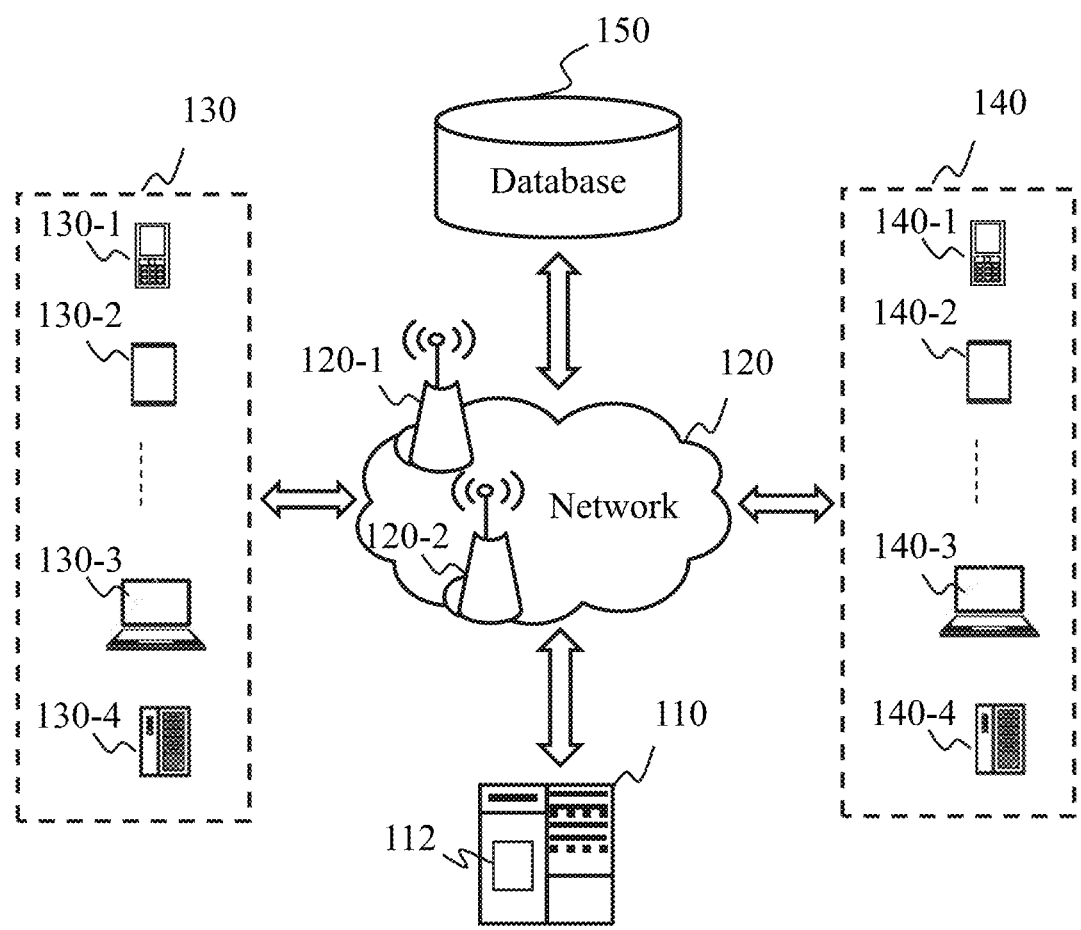
FIG. 1 is a block diagram of an exemplary online on-demand service system 100 according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to allocate a set of sharable orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "passenger," "requester," "requestor," "service requester," "service requestor" and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to methods of an electronic device to switch operation mode based on status thereof. For example, when the electronic device, such as a smartphone with GPS capability, is displaying a real-time map when it is moving towards a destination, the electronic device may switch displaying the map from a plan view to a perspective view when it is less than 50 meters away from the destination, and then switch back to the plan view when it is moving away and more than 10 meters from the destination. In addition to the distance, the electronic device may also change the view of the map based on its speed, or perform different functions, such as making different sounds when the said distance and/or speed changes over a threshold value, One of the purpose of the above method is to provide a better reminder for a driver (e.g., a taxi driver) to identify an unfamiliar target (e.g., a building to pick up a passenger or the passenger him/her self) when he/she approaches a destination. The problem raises, and the technical solution introduced herein roots in the application of GPS system, a system appeared in post-Internet era.

FIG. 1 is a block diagram of an exemplary online on-demand service system 100 according to some embodiments of the present disclosure. For example, the online on-demand service system 100 may be an online on-demand service platform for on-demand services such as taxi hailing service, goods delivery service, chauffeur service, express car service, carpool service, bus service, short-term driver-renting service, and shuttle service. The online on-demand service system 100 may be an online platform including a server 110, a network 120, a requester terminal 130, a provider terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the database 150 via the network 120. As another example, the server 110 may be directly connected to the requester terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may collect information of a plurality of historical on-demand services, and determine a currently recommended service location. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the online on-demand service system 100 (e.g., the server 110, the requester terminal 130, the provider terminal 140, and the database 150) may send information and/or data to other component(s) in the online on-demand service system 100 via the network 120. For example, the server 110 may obtain/acquire service request from the requester terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online on-demand service system 100 may be connected to the network 120 to exchange data and/or information.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the position of the provider and/or the provider terminal 140. In some embodiments, the requester terminal 130 and/or the provider terminal 140 may communicate with other positioning device to determine the position of the requester, the requester terminal 130, the provider, and/or the provider terminal 140. In some embodiments, the requester terminal 130 and/or the provider terminal 140 may send positioning information to the server 110.

The database 150 may store data and/or instructions. In some embodiments, the database 150 may store data obtained from the requester terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the online on-demand service system 100 (e.g., the server 110, the requester terminal 130, the provider terminal 140, etc.). One or more components in the online on-demand service system 100 may access the data or instructions stored in the database 150 via the network 120. In some embodiments, the database 150 may be directly connected to or communicate with one or more components in the online on-demand service system 100 (e.g., the server 110, the requester terminal 130, the provider terminal 140, etc.). In some embodiments, the database 150 may be part of the server 110.

In some embodiments, one or more components in the online on-demand service system 100 (e.g., the server 110, the requester terminal 130, the provider terminal 140, etc.) may have a permission to access the database 150. In some embodiments, one or more components in the online on-demand service system 100 may read and/or modify information relating to the requester, provider, and/or the public when one or more conditions are met. For example, the server 110 may read and/or modify one or more users' information after a service. As another example, the provider terminal 140 may access information relating to the requester when receiving a service request from the requester terminal 130, but the provider terminal 140 may not modify the relevant information of the requester.

In some embodiments, information exchanging of one or more components in the online on-demand service system 100 may be achieved by way of requesting a service. The object of the service request may be any product. In some embodiments, the product may be a tangible product, or an intangible product. The tangible product may include food, medicine, commodity, chemical product, electrical appliance, clothing, car, housing, luxury, or the like, or any combination thereof. The intangible product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be implemented as a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
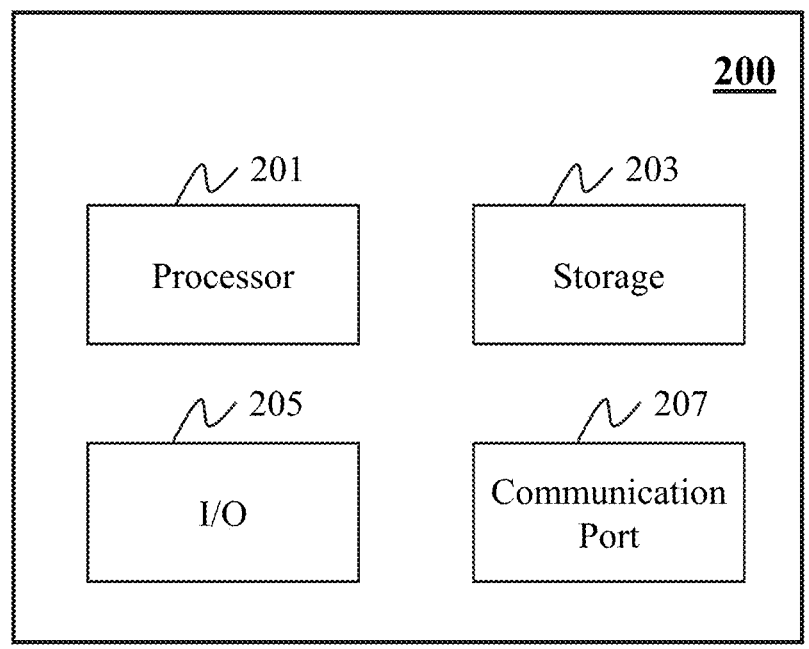
FIG. 2 is a schematic diagram illustrating exemplary hardware and software components of a computing device 200 according to some embodiments of the present disclosure.

FIG. 2 is a schematic diagram illustrating exemplary hardware and software components of a computing device 200 on which the server 110, the requester terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

As illustrated in FIG. 2, the computing device 200 may include a processor 201, a storage 203, an input/output (I/O) 205, and a communication port 207.

The processor 201 may execute computer instructions (e.g., program code) and perform functions of the online on-demand service system 100 in accordance with techniques described herein. The computer instructions may include, for example, routines, programs, objects, components, data structures, procedures, modules, and functions, which perform particular functions described herein. For example, the processor 201 may identify the status of a terminal (e.g., the requester terminal 130, the provider terminal 140, etc.). In some embodiments, the processor 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 203 may store data/information obtained from the requester terminal 130, the provider terminal 140, and/or any other component of the online on-demand service system 100. In some embodiments, the storage 203 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for the processing engine 140 to perform a predetermined action based on the status of a terminal (e.g., the requester terminal 130, the provider terminal 140, etc.).

The I/O 205 may input and/or output signals, data, information, etc. In some embodiments, the I/O 205 may enable a user interaction with the processing engine 140. In some embodiments, the I/O 205 may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 207 may be connected to a network (e.g., the network 120) to facilitate data communications. The communication port 207 may establish connections between the device 110, the device 130, and/or any other component of the online on-demand service system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 207 may be and/or include a standardized communication port, such as RS232, RS485, etc. In some embodiments, the communication port 207 may be a specially designed communication port. For example, the communication port 207 may be designed in accordance with the digital imaging and communications in medicine (DICOM) protocol.

Figure 3:
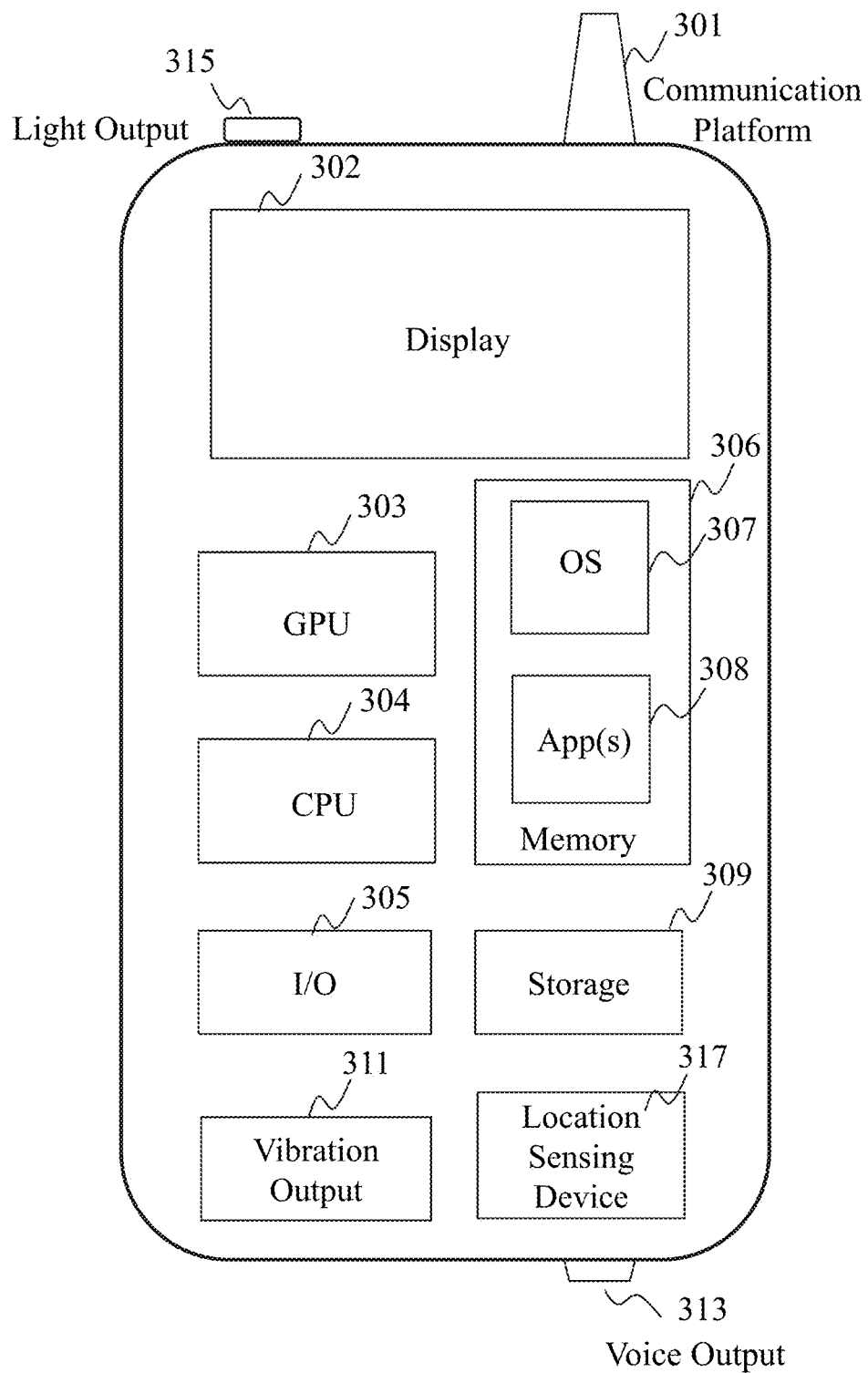
FIG. 3 is a schematic diagram illustrating exemplary hardware and/or software components of an exemplary mobile device 300 according to embodiments of the present disclosure.

FIG. 3 is a schematic diagram illustrating exemplary hardware and/or software components of an exemplary mobile device 300 on which the online on-demand service system 100 may be implemented according to some embodiments of the present disclosure. As illustrated in FIG. 3, the mobile device 300 may include a communication platform 301, a display 302, a graphic processing unit (GPU) 303, a central processing unit (CPU) 304, an I/O 305, a memory 306, a storage 309, a vibration output 311, a sound output 313, a light output 315, and a location sensing device 317. In some embodiments, any other suitable component, including but not limited to a system bus or a controller (not shown), may also be included in the mobile device 300.

In some embodiments, a mobile operating system 307 (e.g., iOS™, Android™, Windows Phone™ etc.) and one or more applications 308 may be loaded into the memory 306 from the storage 309 in order to be executed by the CPU 304. The applications 308 may include a browser or any other suitable mobile apps for receiving and rendering information relating to image processing or other information from the online on-demand service system 100. User interactions with the information stream may be achieved via the I/O 305 and provided to the database 150, the server 110 and/or other components of the online on-demand service system 100.

The vibration output 311 may include a vibration device that generates a vibration. The vibration device may include but is not limited to a vibration motor, a vibrator, an oscillator, or the like, or any combination thereof. The amplitude and frequency of the vibration may be configured by the CPU 304. For example, the amplitude and frequency of the vibration may be constant, regularly changed, or irregularly changed. The voice output 313 may include an acoustic generator (e.g. a speaker) that generates sound. The loudness and frequency of the sound may be configured by the CPU 304. For example, the loudness and frequency of the sound may be constant, regularly changed, or irregularly changed. The light output 315 include an optical component that generates light. The optical component may include but not is not limited to a liquid crystal display (LCD), a light emitting diode (LED), a cathode ray tube (CRT), etc. In some embodiments, the light output 315 may generate light solely or jointly with the display 302. The color (or frequency) and intensity of the light may be configured by the CPU 304. For example, the color, intensity, and flashing frequency of the light may be constant, regularly changed, or irregularly changed. The location sensor 317 may locate the position of the mobile device 300. In some embodiments, the location sensing device 317 may include a Global Position System (GPS).

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

One of ordinary skill in the art would understand that when an element of the on-demand service system 100 performs, the element may perform through electrical signals and/or electromagnetic signals. For example, when a requestor terminal 130 sends out a service request to the server 110, a processor of the requestor terminal 130 may generate an electrical signal encoding the request. The processor of the service requestor terminal 130 may then send the electrical signal to an output port. If the requestor terminal 130 communicates with the server 110 via a wired network, the output port may be physically connected to a cable, which further transmit the electrical signal to an input port of the server 110. If the requestor terminal 130 communicates with the server 110 via a wireless network, the output port of the service requestor terminal 130 may be one or more antennas, which convert the electrical signal to electromagnetic signal. Similarly, a service provider terminal 130 may receive an instruction and/or service request from the server 110 via electrical signal or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
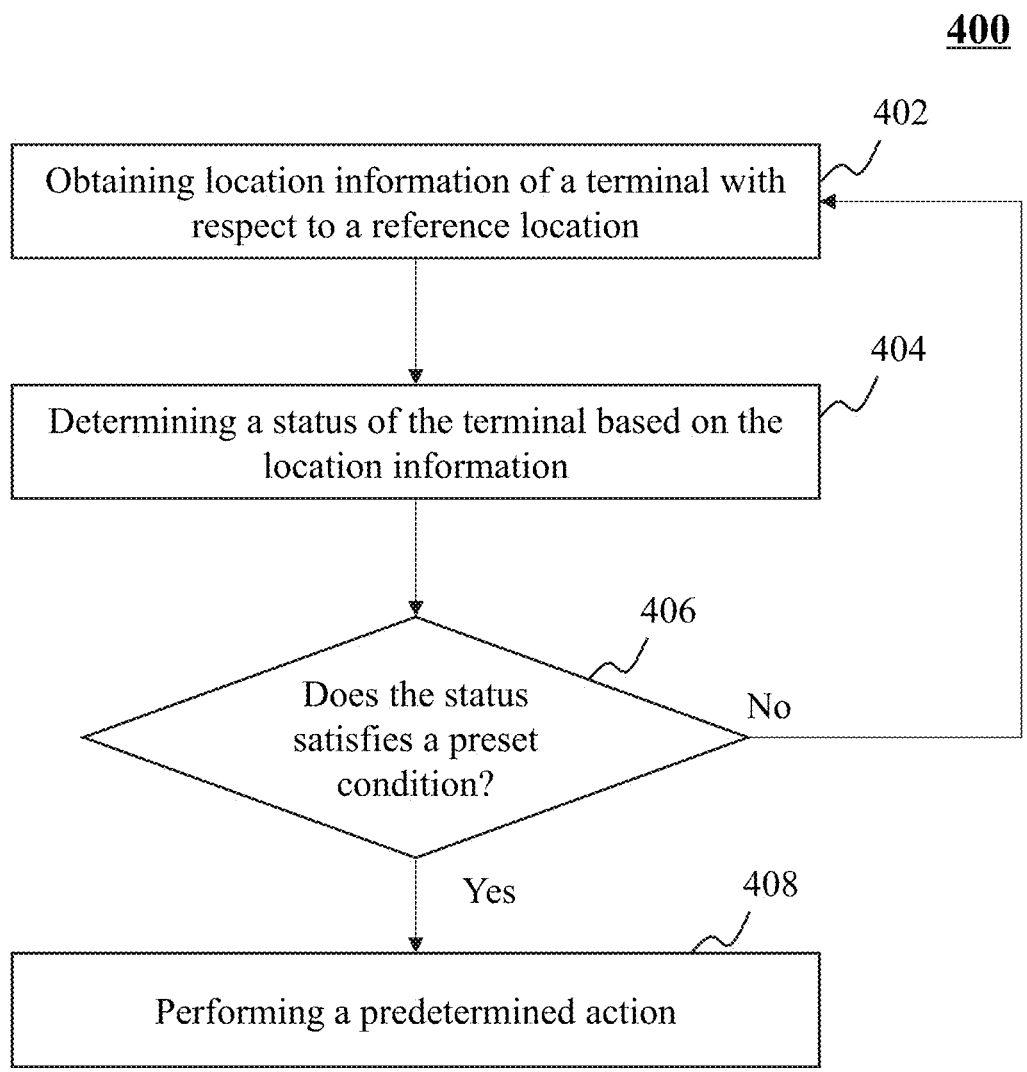
FIG. 4 is a flowchart illustrating an exemplary process for performing a location-based action according to some embodiments of the present disclosure.

FIG. 4 is a flowchart illustrating an exemplary process for performing a location-based action according to some embodiments of the present disclosure. The process and/or method 400 may be executed by a device in the online on-demand service system 100. In some embodiments, at least part of process 400 may be performed by computing device 200 shown in FIG. 2. In some embodiments, at least part of process 400 may be performed by the mobile device 300 shown in FIG. 3. For example, the process and/or method 400 may be implemented as a set of instructions (e.g., an application) stored in a storage medium. A processor of an electronic device (e.g., a terminal and/or a server) may execute the set of instructions and may accordingly be directed to perform the process and/or method 400 via receiving and/or sending electronic signals.

In 402, a device may obtain location information of a terminal with respect to a reference location.

The device may be the terminal itself or a server in the online on-demand service system 100. The terminal may include a mobile device (a smart home device, a wearable device, a smart mobile device, a virtual reality device, an augmented reality device, etc.), a tablet computer, a laptop computer, a built-in device in a motor vehicle (e.g., an onboard computer, an onboard television, etc.), or the like, or any combination thereof. In some embodiments, the terminal may be a requester terminal 130 or a provider terminal 140.

The reference location may be a location that a terminal wants to go to. For example, the reference location for a terminal of a service provider (also referred to as a provider terminal), such as a taxi driver, may be a current location of a service requester (e.g., a passenger), an appointed pick-up location, a destination of the service requester, a recommended destination for the service requester, or the like. More descriptions regarding the reference location may be found elsewhere in the present disclosure. See, e.g., FIG. 5 and the relevant descriptions.

The location information may include geographic information, distance information, speed information, time information, direction information, acceleration information, or other types of information directly or indirectly associated with location of the terminal. The geographic information may include but is not limited to a current location of the terminal. The distance information may include but is not limited to a threshold distance and/or a distance between the current location of the terminal and the reference location. The speed information may include but is not limited to a moving speed of the terminal (i.e., the rate of change of the location of the terminal) and/or a threshold speed. The direction information may include but is not limited to a moving direction of the terminal and/or a threshold direction. The acceleration information may include but is not limited to an acceleration of the terminal and/or a threshold acceleration. The time information may include but is not limited to an estimated required time for the terminal to arrive at the reference location, a threshold time, an estimated arrival time to arrive at the reference location, and/or a threshold arrival time. In some embodiments, the location information of the terminal may be obtained continuously or periodically (e.g., in every second, etc.). More descriptions regarding the location information may be found elsewhere in the present disclosure. See, e.g., FIGS. 5 to 7 and the relevant descriptions.

In 404, the device may determine a status of the terminal based on the location information.

The status of the terminal may be determined based on one or more types of location information. For example, a status of the terminal may be determined based on distance information (e.g., a threshold distance and a distance between the current location of the terminal and the reference location, etc.). More descriptions regarding the determination of the status based on the distance information may be found elsewhere in the present disclosure. See, e.g., FIG. 5 and the relevant descriptions. As another example, the status of terminal may be determined based on distance information and speed information. More descriptions regarding the determination of status based on the distance information and the speed information may be found elsewhere in the present disclosure. See, e.g., FIG. 7 and the relevant descriptions.

In 406, the device may make a judgment as to whether the status of the terminal satisfies a preset condition.

The preset condition may include a particular status and/or a particular change of status. For illustration purpose, assuming that the terminal can be any status of N possible statuses, e.g., a $1^{st}$ status, a $2^{nd}$ status, ..., and a $N^{th}$ status, the preset condition may be a particular status such as the $1^{st}$ status, the $2^{nd}$ status, etc. Alternatively, the preset condition may be a particular change of status such as a change from the $1^{st}$ status to the $2^{nd}$ status, a change from the $4^{th}$ status to the $3^{rd}$ status, etc. Upon determining that the status of the terminal satisfies the preset condition, 408 may be performed. Otherwise, 402 may be performed again to obtain location information of the terminal.

In 408, a predetermined action may be performed. For example, the terminal may make the above judgement and actively perform the predetermined action. Alternatively, when the device is a server, the server may make the above judgment and then instruct the terminal or another terminal to perform the predetermined action.

The predetermined action may include providing a notification, changing a view of displaying a map, displaying recommendation information on the terminal or the another terminal, or the like, or any combination thereof. The predetermined actions may be the same or different with respect to different preset conditions. For example, the notification and recommendation information may be provided when the terminal changes from a first status to a second status. The view of displaying a map may change when the terminal changes from a second status to a third status. In some embodiments, if multiple predetermined actions need to be performed, the multiple predetermined actions may be performed simultaneously or in sequence.

The predetermined action may also be performed on multiple terminals (e.g., the provider terminal, the requester terminal, etc.) in the online on-demand service system 100. In some embodiments, upon determining that the status of the provider terminal 140 satisfies a preset condition, a predetermined action may be performed by the provider terminal 140 and a corresponding requester terminal 130, respectively. For example, the provider terminal 140 may provide a vibration notification to the service provider and the requester terminal 130 may provide a sound notification to the service requester. Additionally, a view of displaying a map of the provider terminal 140 may change from a plan view to a perspective view. More descriptions regarding the notification, the displaying view, and/or the recommendation information may be found elsewhere in the present disclosure. See, e.g., FIG. 5 and the relevant descriptions.

Figure 5:
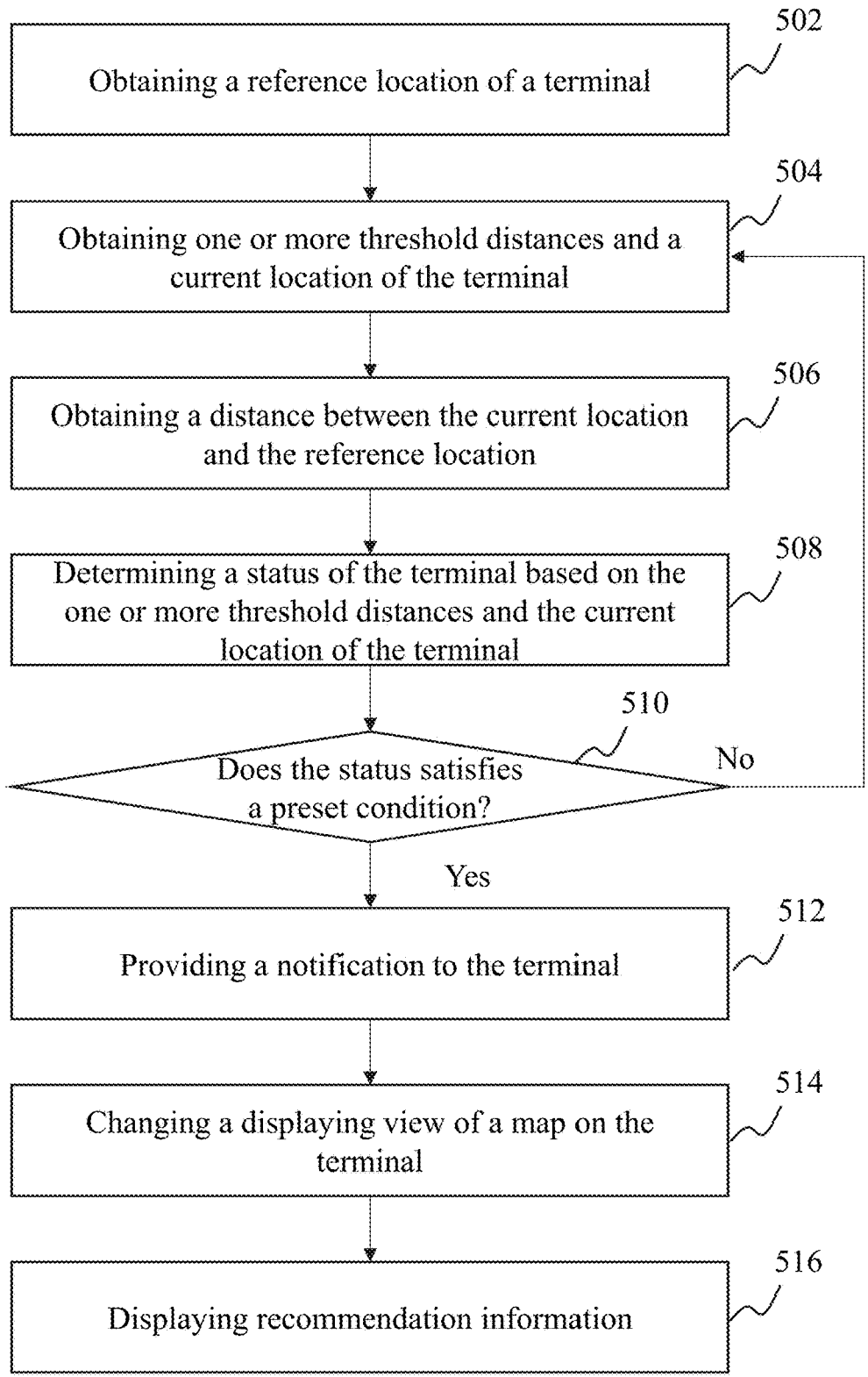
FIG. 5 is a flowchart illustrating an exemplary process for performing a location-based action according to some embodiments of the present disclosure.

FIG. 5 is a flowchart illustrating an exemplary process for performing a location-based action according to some embodiments of the present disclosure. The process and/or method 500 may be executed by a device in the online on-demand service system 100. Process 500 may be an exemplary embodiment of process 400 with reference to FIG. 4. In some embodiments, at least part of process 500 may be performed by computing device 200 shown in FIG. 2. In some embodiments, at least part of process 500 may be performed by the mobile device 300 shown in FIG. 3. For example, the process and/or method 500 may be implemented as a set of instructions (e.g., an application) stored in a storage medium. A processor of an electronic device (e.g., a terminal and/or a server) may execute the set of instructions and may accordingly be directed to perform the process and/or method 400 via receiving and/or sending electronic signals.

In 502, a reference location of a terminal may be obtained. The reference location may be obtained by the terminal itself, or may be obtained by a server of the system 100 and/or the another terminal, and then sent to the terminal by the server.

The terminal may be a provider terminal or a requester terminal, and the reference location may be a location that the terminal wants to go to. For example, the reference location of the provider terminal 140 may be a current location of a service requester, an appointed pick-up location, a destination of the service requester, a recommended destination for the service requester, or the like. In a transportation service (e.g. a car hailing service), a driver (service provider) may need to pick up a passenger (service requester). On the way of picking up the passenger, the reference location of the driver's terminal may be a current location of the passenger or an appointed pick-up location. When the driver picks up the passenger, the reference location of the driver's terminal may be a destination of the passenger or a recommended destination for the passenger (e.g., a nearest hospital, a scenery spot, etc.) if no specific destination is provided. As another example, the reference location of the requester terminal 130 may be an appointed place with the service provider, a destination of the service requester, or a recommended destination for the service requester, or the like.

In 504, a threshold distance and a current location of the terminal may be obtained.

The threshold distance may be 5 m, 10 m, 20 m, 50 m, 100 m, 200 m, or any other values. The threshold distance may be set by a user of the terminal or be determined by one or more components in the online on-demand service system 100. For example, the threshold distance may be determined by the server 110. In some embodiments, the threshold distance may vary with time, user, location, etc. Merely by way of example, a threshold distance for a driver's terminal with respect to a reference location in daytime may be less than a threshold distance in nighttime with respect to the same reference location.

The current location of the terminal may be determined based on a positioning technology, such as, a GPS positioning technology, a base station positioning technology, a WIFI positioning technology, etc. In some embodiments, the current location of the terminal be determined by a built-in device in a vehicle, such as, a vehicle navigation system or a tachograph, etc.

In 506, a distance between the current location and the reference location may be obtained. The distance may be obtained by the terminal itself, and/or may be obtained by the server of the system 100 and/or the another terminal, and then sent to the terminal by the server and/or the another terminal.

The distance between the current location and the reference location may be a straight-line distance or an actual distance (e.g. a distance of a route between the current location and the reference location). The route between the current location and the reference location may be determined based on traffic information, weather information, user preference information, geographic information related to the current location and the reference location, or the like, or any combination thereof. In some embodiments, multiple routes between the current location and the reference location may be obtained. The multiple routes may be ranked based on ranking criteria. The ranking criteria may include a travelling time, a travelling distance, a number of traffic lights, a number of scenery spots, or the like, or any combination thereof. The route may than be determined based on the ranking result. For example, a route with smallest travelling time may be selected and an actual distance of the selected route may be obtained. In some embodiments, the selected route may further be displayed on a map of the terminal.

In 508, a status of the terminal may be determined based on the threshold distance and the current location of the terminal. The status may be obtained by the terminal itself, and/or may be obtained by the server of the system 100 and/or the another terminal, and then sent to the terminal by the server and/or the another terminal.

Figure 10:
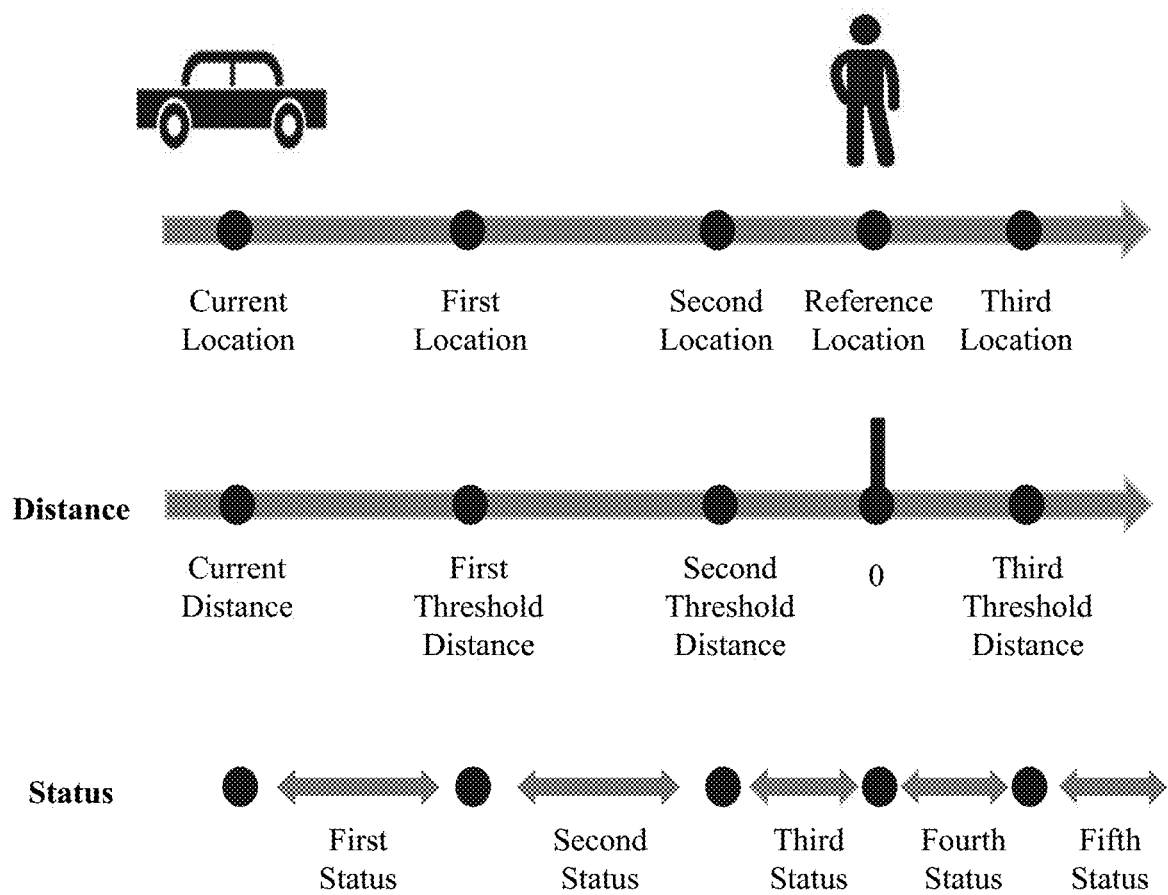
FIG. 10 is a schematic diagram for determining a location-based status according to some embodiments of the present disclosure.

As shown in FIG. 10, the terminal may be a mobile device of a driver and the reference location may be a current location of the passenger. The current location of the driver may be continuously or periodically obtained. When the driver drives to the passenger, the distance between the current location and the reference location may be a decreasing positive number. When the driver arrives at the current location of the passenger, the distance may be zero. When the driver picks up the passenger and drives to a destination of the passenger, the distance may be a decreasing negative number.

As illustrated in FIG. 10, the status of the driver may be determined based on a first distance threshold, a second distance threshold, and a third distance threshold. When the distance is equal to or greater than the first distance threshold, the driver may be in a first status. When the distance is less than the first threshold distance and equal to or greater than the second distance threshold, the driver may be in a second status. When the distance is less than the second threshold distance and equal to or greater than zero, the driver may be in a third status. When the distance is less than the zero and equal to or greater than the third distance threshold, the driver may be in a fourth status. When the distance is less than the third distance threshold, the driver may be in a fifth status.

It should be noted that the example illustrated in FIG. 10 is provided merely for the purpose of illustration, and not intended to limit the scope of the present disclosure. For example, the terminal may have any number of threshold distances and the terminal may have any number of statuses corresponding to the threshold distances. For example, the driver may be determined to be in a first status (e.g., far from the passenger) when the distance is equal to or greater than a distance threshold. Otherwise, the driver may be determined to be in a second status (e.g., close to the passenger) when the distance is less than the distance threshold.

In 510, a judgment may be made as to whether the status of the terminal satisfies a preset condition. The judgment may be made by the terminal itself, and/or may be made by the server of the system 100 and/or the another terminal, and then sent to the terminal by the server and/or the another terminal.

The preset condition may include a particular status and/or a particular change of status For example, the preset condition may include but is not limited to a change of status from the first status to the second status. Upon determining that the status of the terminal satisfied the preset condition, 512 be performed. Otherwise, 504 may be performed and the current location of the terminal may be obtained again. More descriptions regarding the preset condition may be found elsewhere in the present disclosure. See, e.g., FIG. 4 and the relevant descriptions.

In 512, the terminal may perform a notification.

The notification may include a vibration notification, a light notification, a sound notification, a text notification, an image notification, or the like, or any combination thereof. The notification may have one or more notification parameters. For example, the notification parameters of a vibration notification may include a vibrating amplitude, a vibrating frequency, a vibrating cycle, or the like, or any combination thereof. The notification parameters of a light notification may include a lighting intensity, a lighting frequency, a flashing frequency, or the like, or any combination thereof. The notification parameters of a sound notification may include a loudness, an audible frequency, or the like, or any combination thereof. The notification parameters may vary with time, user, location, etc. Merely by way of example, a vibration notification for a driver's terminal may have a greater vibrating frequency in nighttime than in daytime. The notification parameters of the notification may be constant or changing. For example, the vibrating frequency of a vibration notification may be constant, gradually increasing, suddenly increasing, gradually decreasing, suddenly decreasing, or the like, or any combination thereof.

The notification parameters of the notification may be set by a user or be determined by one or more components in the online on-demand service system 100. For example, a driver or a passenger may choose the way of notification and set corresponding notification parameters via a user interface of a mobile device. In some embodiments, the notification and the notification parameters may be related to location information of a terminal. Merely by way of example, the vibrating frequency of a vibration notification may be inversely proportional to the distance between the current location and the reference location. As another example, when the terminal arrives at the reference location, the notification may stop. More descriptions regarding the correlation between the notification and location information of terminal may be found elsewhere in the present disclosure. See, e.g., FIG. 8 and the relevant descriptions.

In 514, the display may change the view of displaying a map on the terminal.

The map may display a route from the current location to the reference location. In some embodiments, the map may also display information related to the route (e.g., streets, buildings along the route, traffic information, etc.). The views of displaying the map may include a plan view, a perspective view, a satellite view, a bird's eye view, a driver's eye view, or the like, or any combination thereof. The plan view may display the route and related information in a regular map. The perspective view may display the route and the related information in a 3-dimensional map. The satellite view may display the route and the related information in a satellite map based on the images collected by satellites. The bird's eye view may display the route and the related information at a particular height and a direction. The driver's view may display the route and related information at a simulated view of the driver based on the driver's location and direction. The views of displaying the map may be the same or different with respect to terminals in different statuses.

Upon determining that the preset condition is satisfied, the terminal may change the map from a first view to a second view. For example, when the terminal is in a first status, e.g., the distance between the current location and the reference location is greater than or equal to a first threshold distance, the terminal may display the route and related information in a plan view. When the terminal changes to a second status, e.g., the distance becomes less than the first threshold distance, the route may be displayed under a perspective view. When the terminal further changes to a third status, e.g., the distance between the current location and the reference location is greater than a second threshold, the route may be displayed under the plan view again.

In 516, the terminal may display recommendation information on the terminal.

The recommendation information may include information about one or more locations along a route from the current location to the reference location or one or more locations near the reference location. The one or more locations may include a building (e.g., a hospital, a supermarket, a school, etc.), a station (e.g., a bus station, a train station, etc.), a street, a scenery (e.g., a mountain, a river, a scenic spot, etc.), or the like. The recommendation information may be displayed and/or highlighted on the terminal in any color, any size, any shape, and any format (e.g., a graph, an icon, a character, etc.). Different recommendation information may be displayed in same or different ways. For example, different recommendation information may be displayed in the same color but different shapes.

Upon determining that the preset condition is satisfied, the terminal may display recommendation information. In some embodiments, before displaying recommendation information, the terminal may perform and/or display an inquiry to ask the user if he/she needs the recommendation information. If so, the recommendation information may be displayed. Otherwise, the recommendation information may not be displayed.

In some embodiments, the terminal may rank the one or more locations may and display the recommendation information based on the ranking result. For example, the one or more locations may be ranked based the distance between their locations and the reference location. The recommendation information of the locations may be displayed in different sizes or colors according to ranking result. More descriptions regarding the displaying recommendation information may be found elsewhere in the present disclosure. See, e.g., FIG. 9 and the relevant descriptions.

It should be noted that the above descriptions of process 500 are provided for the purposes of illustration, and not intended to limit the scope of the present disclosure. For persons having ordinary skills in the art, various modifications and changes in the forms and details of the application of the above method and system may occur without departing from the principles in the present disclosure.

However, those variations and modifications also fall within the scope of the present disclosure. In some embodiments, multiple threshold distances may be obtained in 504 and the status of the terminal may be determined on the multiple threshold distances and the distance between the current location and the reference location in 508. In some embodiments, one or more operations may be added or omitted. For example, some or all of 512, 514, and 516 may be omitted. As another example, an additional judgment may be performed to determine whether the terminal arrives at the reference location. If the terminal arrives at the reference location, the terminal may stop providing notification and/or stop displaying the recommendation information. Additional, the terminal may display a route from the reference location to another destination. In some embodiments, the order of 512, 514, and 516 may be changed. For example, 512, 514, and 516 may be performed simultaneously or in any order.

Figure 6:
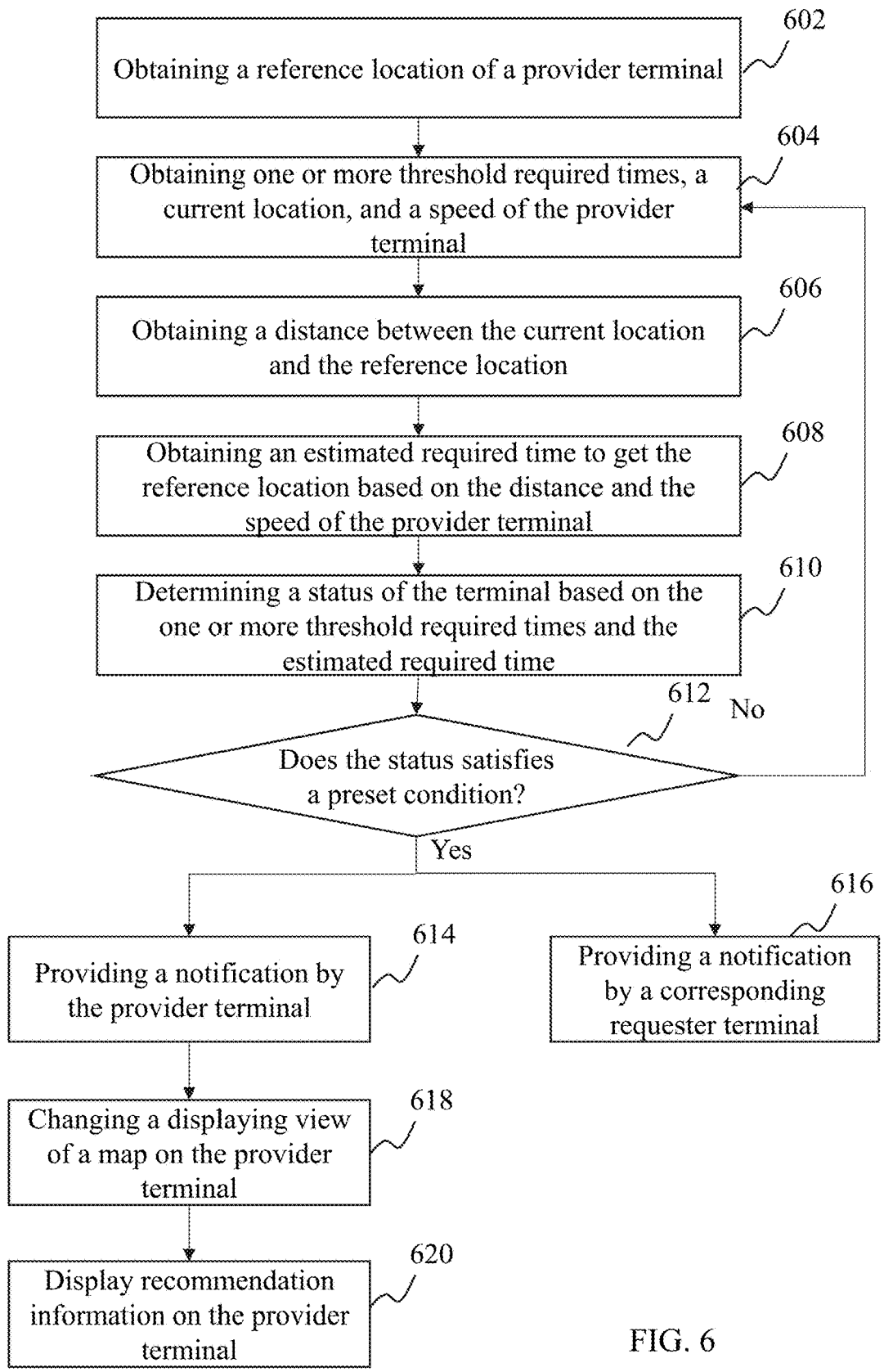
FIG. 6 is a flowchart illustrating an exemplary process for performing a location-based action according to some embodiments of the present disclosure.

FIG. 6 is a flowchart illustrating an exemplary process for performing a location-based action according to some embodiments of the present disclosure. Process 600 may be an exemplary embodiment of process 400 with reference to FIG. 4. The process and/or method 600 may be executed by a device in the online on-demand service system 100. In some embodiments, at least part of process 600 may be performed by computing device 200 shown in FIG. 2. In some embodiments, at least part of process 600 may be performed by the mobile device 300 shown in FIG. 3. For illustration purpose, the process 600 is described with respect to a provider terminal. However, it should be noted that process 600 may be implemented on a requester terminal or any other terminal as well.

In 602, a reference location of a provider terminal may be obtained. Operation 602 may be substantially similar to 502 and is not repeated.

In 604, a threshold time, a current location, and a speed of the provider terminal may be obtained. The threshold time, the current location, and the speed may be obtained by the terminal itself, and/or may be obtained by the server of the system 100 and/or the another terminal, and then sent to the terminal by the server and/or the another terminal.

The threshold time may be 30 seconds, 1 minutes, 3 minutes, or any other values. The speed of the terminal may be an instantaneous speed, an average speed in a time interval, or a preset speed corresponding to the type of the road. For example, the speed may be an average speed of the provider terminal in the last 0.1 second, 1 second, 10 seconds, 1 minute, 3 minutes, etc. As another example, the speed may be a preset speed (e.g. 100 km/h in highways or 60 km/h in city roads). In some embodiments, the speed of the terminal may be determined by a processor in the provider terminal or the server 110 based on the change of the current location of provider terminal. In some embodiments, the speed of the provider terminal may be determined by a built-in device in a vehicle, such as, a vehicle speedometer, etc.

In 606, a distance between the current location and the reference location may be obtained. Operation 606 may be substantially similar to 506 and is not repeated.

In 608, an estimated required time of getting to the reference location may be obtained based on the distance between the current location and the reference location and the speed of the provider terminal.

The estimated required time may be obtained by the terminal itself, and/or may be obtained by the server of the system 100 and/or the another terminal, and then sent to the terminal by the server and/or the another terminal. The estimated required time may be a ratio of the distance to the speed of the provider terminal. In some embodiments, the estimated required time may be determined based the distance, the speed of the provider terminal and other related information, such as, traffic information, weather information, or the like.

In 610, a status of the provider terminal may be determined based on the threshold time and the estimated required time. The status of the provider terminal may be determined by the provider terminal itself, and/or may be determined by the server of the system 100 and/or the another terminal (e.g., a passenger terminal), and then sent to the provider terminal by the server and/or the another terminal.

For example, if the estimated required time is greater than or equal to a threshold time, the provider terminal may be determined to be in a first status, i.e. still on the way. If the estimated required time is less than the threshold time, the provider terminal may be determined to be in a second status, i.e. arriving soon. Additionally, if the estimated required time or the distance between the current location and the reference location is equal to zero, the provider terminal may be determined to be in a third status, i.e. arriving at the reference location.

In 612, a judgment may be made as to whether the status of the provider terminal satisfies a preset condition. Operation 612 may be substantially similar to 510 and is not repeated. Upon determining that the status of the provider terminal satisfies the preset condition, 614 and/or 616 may be performed. Otherwise, 604 may be performed again to obtain the current location and the speed of the provider terminal.

In 614, a notification may be provided by the provider terminal. In 616, a notification may be provided by a corresponding requester terminal. The notifications in 614 and 616 may be similar to that described in FIG. 5 and are not repeated. The notifications provided by the provider terminal and the requester terminal may be of the same or different types. The notifications provided by the provider terminal and the requester terminal may have a same or different values of notification parameter if they are of the same type. For example, the notification provided by the provider terminal to the service provider may be a vibration notification and the notification provided by the corresponding requester terminal to the service requester may be a light notification. As another example, the notifications provided by the provider terminal may have a higher vibrating frequency than that of the requester terminal.

In some embodiments, the preset condition with respect to the provider terminal and the preset condition with respect to the requester terminal may be different. For example, if the estimated required time of getting to the reference location is less than three minutes, 614 may be performed to provide a notification to the service provider. However, a notification may not be provided to the service requester until the estimated required time of getting to the reference location is less than one minute.

In 618, the provider terminal may change a view of displaying a map. In 620, the provider terminal may display recommendation information. Operations 618 and 620 may be substantially similar to 514 and 516, respectively, and are not repeated.

It should be noted that the above descriptions of process 600 are provided for the purposes of illustration, and not intended to limit the scope of the present disclosure. For persons having ordinary skills in the art, various modifications and changes in the forms and details of the application of the above method and system may occur without departing from the principles in the present disclosure.

However, those variations and modifications also fall within the scope of the present disclosure. In some embodiments, multiple threshold time may be obtained in 604 and the status of the terminal may be determined on the multiple threshold time and the estimated required time in 610. In some embodiments, one or more operations may be added or omitted. For example, some or all steps of 614 to 620 may be omitted. As another example, an additional operation may be performed to change a view of displaying a map on the requester terminal or display recommendation information on the requester terminal. In some embodiments, the order of the operations in process 600 may be changed. For example, 614 to 620 may be performed simultaneously or in any order.

Figure 7:
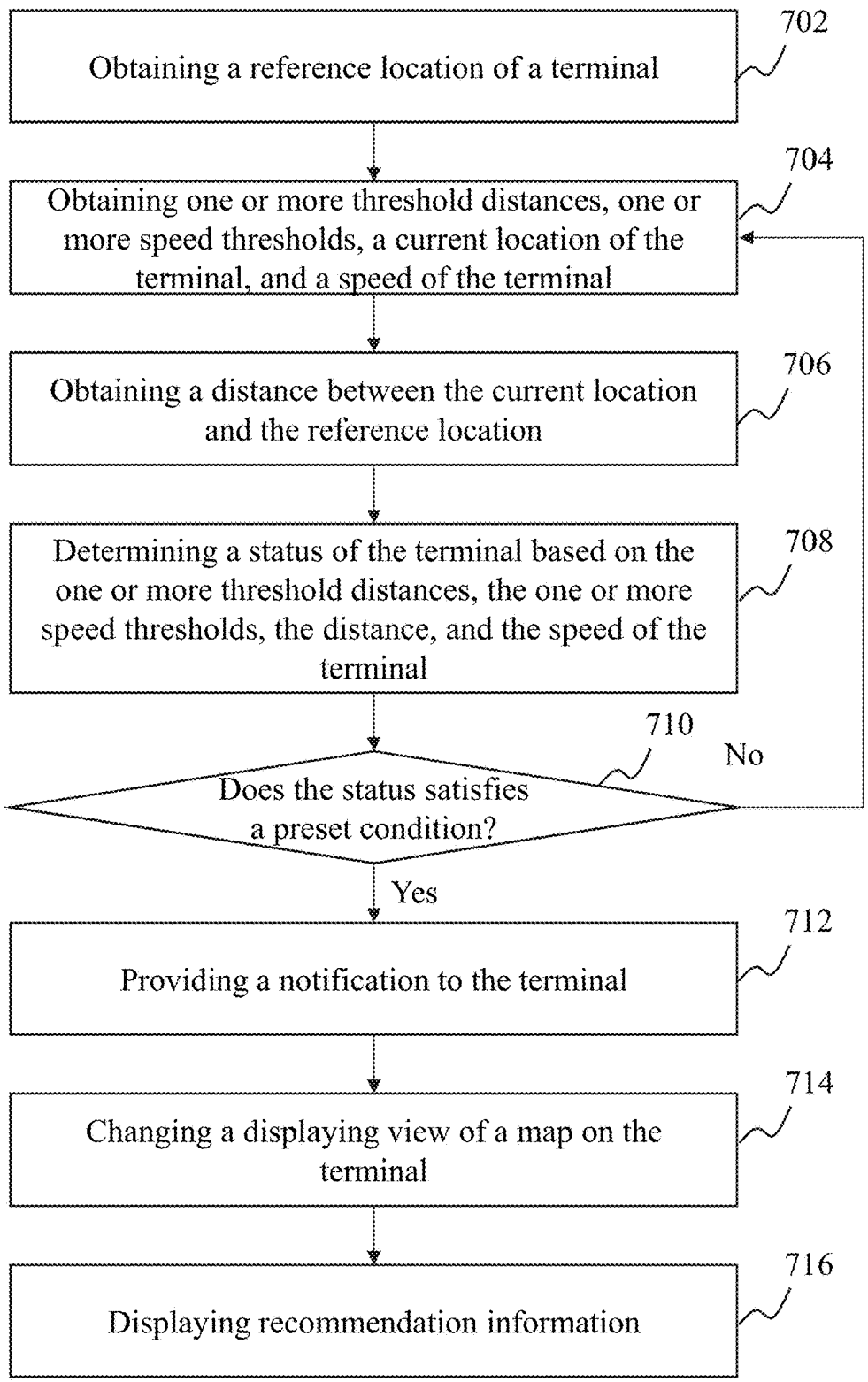
FIG. 7 is a flowchart illustrating an exemplary process for performing a location-based action according to some embodiments of the present disclosure.

FIG. 7 is a flowchart illustrating an exemplary process for performing a location-based action according to some embodiments of the present disclosure. Process 700 may be an exemplary embodiment of process 400 with reference to FIG. 4. The process 700 may be executed by a device in the online on-demand service system 100. In some embodiments, at least part of process 700 may be performed by the computing device 200 shown in FIG. 2. In some embodiments, at least part of process 700 may be performed by the mobile device 300 shown in FIG. 3.

In 702, a reference location of a provider terminal may be obtained. Operation 702 may be substantially similar to 502 with reference to FIG. 5 and is not repeated.

In 704, a threshold distance, a threshold speed, a current location of the terminal, and a speed of the terminal may be obtained.

The threshold distance, threshold speed, current location of the terminal may be obtained by the terminal itself, and/or may be obtained by the server of the system 100 and/or the another terminal, and then sent to the terminal by the server and/or the another terminal. The threshold distance may be 5 m, 10 m, 20 m, 50 m, 100 m, 200 m, or any other values. The threshold speed may be 5 km/h, 8 km/h, 10 km/h, 15 km/h, 20 km/h, or any other values. More descriptions regarding the current location and the speed of the terminal may be found elsewhere in the present disclosure. See, e.g., FIG. 5 and FIG. 6 and the relevant descriptions.

In 706, a distance between the current location and the reference location may be obtained. Operation 706 may be substantially similar to 506 with reference to FIG. 5 and is not repeated.

In 708, a status of the terminal may be determined based on the threshold distance, the threshold speed, the distance, and the speed of the terminal. The status may be determined by the terminal itself, and/or may be determined by the server of the system 100 and/or the another terminal, and then sent to the terminal by the server and/or the another terminal.

For example, assuming that the status of the terminal is determined based on a threshold distance and a threshold speed, if the distance is greater than the threshold distance and the speed is greater than the threshold speed, the terminal may be determined to be in a first status, i.e. far from the reference location and not ready to stop. If the distance is greater than the threshold distance and the speed is less than the threshold speed, the terminal may be determined to be in a second status, i.e. far from the reference location but wants to stop. If the distance is less than the threshold distance and the speed is greater than the threshold speed, the terminal may be determined to be in a third status, i.e. close to the reference location but not ready to stop. If the distance is less than the threshold distance and the speed is less than the threshold speed, the terminal may be determined to be in a fourth status, i.e. close to the reference location and ready to stop.

It should be noted that the above example is provided for the purpose of illustration, and not intended to limit the scope of the present disclosure. The terminal may have any number of threshold distances and the threshold speeds and any number of corresponding statuses.

In 710, the terminal may make a judgment as to whether the status of the terminal satisfies a preset condition. In 712, the terminal may perform a notification may be provided to. In 714, the terminal may change a view of displaying a map. In 716, the terminal may display recommendation information. Operations 710 to 716 may be substantially similar to 510 to 516, respectively, and are not repeated here.

It should be noted that the above descriptions of process 700 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. In some embodiments, multiple threshold distances and/or multiple threshold speeds may be obtained in 704 and the status of the terminal may be determined on the multiple threshold distances, the multiple threshold speeds, the speed of the terminal, and the distance between the current location and the reference location and the estimated required time in 708. In some embodiments, one or more operations may be added or omitted. For example, some or all of 712 to 716 may be omitted. As another example, an additional operation may be performed to change a view of displaying a map on the requester terminal or display recommendation information on the service terminal. In some embodiments, the order of operations in process 700 may be changed. For example, 712 to 716 may be performed simultaneously or in any order.

Figure 8:
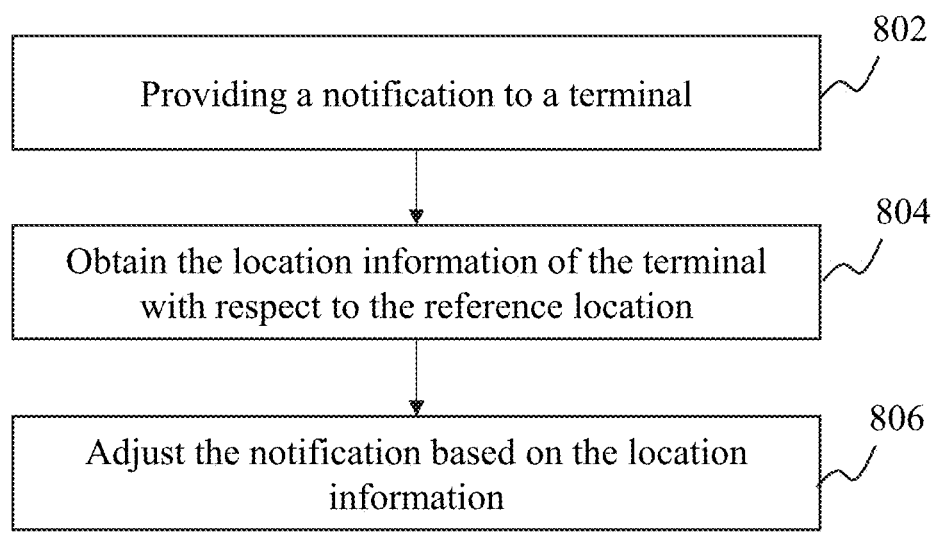
FIG. 8 is a flowchart illustrating an exemplary process for providing a notification based on location information of a terminal according to some embodiments of the present disclosure.

FIG. 8 is a flowchart illustrating an exemplary process for providing a notification based on location information of a terminal according to some embodiments of the present disclosure. Process 800 may be an exemplary embodiment of 408 or 512. The process 800 may be executed by a device in the online on-demand service system 100. In some embodiments, at least part of process 900 may be performed by computing device 200 shown in FIG. 2.

In 802, a terminal may perform a notification. The notification may include a vibration notification, a light notification, a sound notification, a text notification, an image notification, or any other type of notification. The notification may be similar to that described in FIG. 5 and is not repeated here.

In 804, the location information of the terminal may be obtained. The location information may be obtained by the terminal itself, and/or may be obtained by the server of the online on-demand service system 100 and/or the another terminal, and then sent to the terminal by the server and/or the another terminal.

Referring back to FIG. 4, in 402, the location information of the terminal respect to the reference location may include but is not limited to geographic information, distance information, speed information, time information, direction information, or acceleration information. For example, the location information may include a threshold distance, a distance between the current location of the terminal and the reference location, a speed of the terminal, a threshold speed, an estimated required time to get to the reference location, or the like, or a combination thereof.

In 806, the notification may be adjusted based on the location information. As used herein, adjusting the notification may include adjusting the type of notification, adjusting one or more notification parameters, changing the terminal that generates the notification, or the like, or any combination thereof.

For illustration purpose, an adjustment for a vibration notification is taken as an example. Referring to FIG. 10, assuming that a vibration notification is provided to the terminal of the driver when he drives past the first location, the vibrating frequency of the notification may uniformly increase with the decrease of the distance. As another example, when the distance is greater than the second threshold distance, the vibrating frequency of the vibration notification may increase in a first rate with the decrease of the distance. When the distance is smaller than the second threshold distance, the vibrating frequency of the vibration notification may increase in a second rate with the decrease of the distance. The second rate may be greater than the first rate. Alternatively, a stronger notification, such as a sound notification may replace the vibration notification when the distance is smaller than the second threshold distance to attract the driver's attention. Additionally, when the distance is smaller than the second threshold distance, a notification may be provided to the passenger's terminal to notify the passenger that the driver is arriving soon. It should be noted that the descriptions with respect to the adjustment of vibration notification are provided for the purpose of illustration, and not intended to limit the scope of the present disclosure. The notification may be adjusted in any other ways based on the location information of the terminal.

Figure 9:
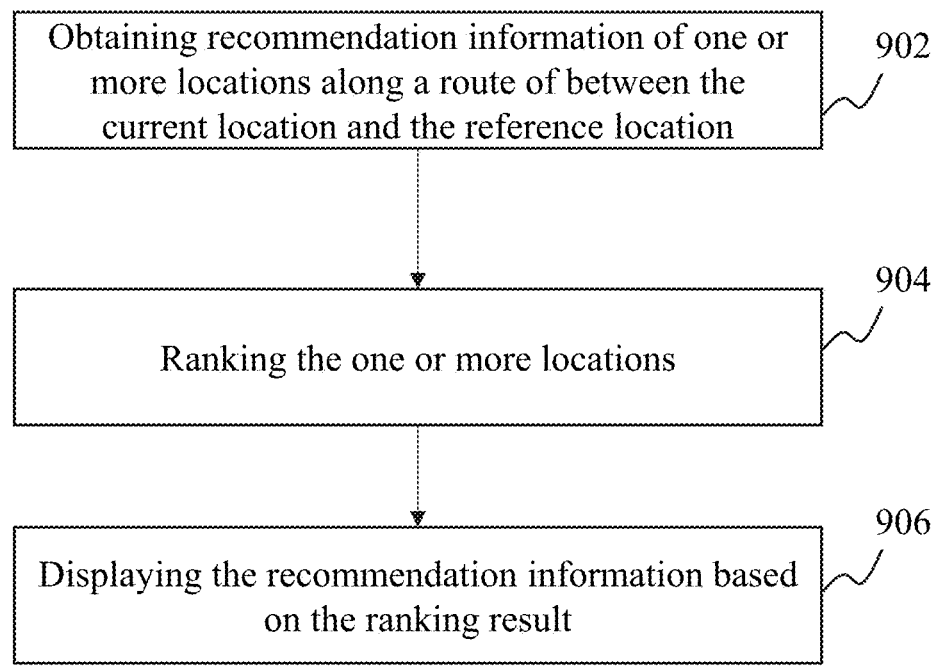
FIG. 9 is a flowchart illustrating an exemplary process for displaying recommendation information on the terminal according to some embodiments of the present disclosure.

FIG. 9 is a flowchart illustrating an exemplary process for displaying recommendation information on the terminal according to some embodiments of the present disclosure. Process 900 may be an exemplary embodiment of 516 with reference to FIG. 5. The process 900 may be executed by a device in the online on-demand service system 100. In some embodiments, at least part of process 900 may be performed by computing device 200.

In 902, recommendation information of one or more locations along a route between the current location and the reference location or around the reference location may be obtained. The one or more locations may be similar to those described in FIG. 5 and are not repeated.

In 904, the one or more locations may be ranked based on one or more ranking criteria. The one or more locations may be ranked by the terminal itself, or may be obtained by a server of the system 100 and/or the another terminal, and then sent to the terminal by the server. The ranking criteria may include a distance between the location and the reference location, a distance between the location and the current location of the terminal, a rating, a score, a number of visitors, a number of visiting times, or the like, or any combination thereof. For example, in a car transportation service, the one or more ranking criteria may include a number of time that the location is set as a destination and/or a start location.

In 906, the terminal may display the recommendation information of the one or more locations based on the ranking result. In some embodiments, only some of the one or more locations may be displayed. For example, only the top locations (e.g., top 3 location, top 5 locations, top 10% locations, etc.) in the ranking result may be displayed. Additionally, the obtained top locations may be further filtered. For example, the top locations may be filtered based on their distances from the reference location. More particularly, only the top locations that are close to the reference location (e.g. the distances between the top locations and the reference location are less than a threshold) may be displayed.

In some embodiments, the terminal may display the recommendation information of the one or more locations in different ways based on the ranking result. For example, the size of the recommendation information of a location may be inversely proportional to its rank in the ranking result. As another example, top 3 locations in the ranking result may be displayed in red and other locations may be displayed in grey. In some embodiments, the way of displaying recommendation information and/or the ranking criteria of the one or more locations and may be set by a user of the terminal.

The following examples illustrates part of the implementation of the systems and methods in the present disclosure:

Example 1

In a car hailing service, the driver may have a mobile device that implements the methods disclosed in present application. At first, a driver may receive a service request from a passenger. The service request may include a current location (also referred to as a reference location) of the passenger and a destination. Once the driver accepts the service request, the mobile device may obtain the current location of the driver and display a route from the driver's current location to the reference location. The mobile device may continuously or periodically obtain the distance between the driver and the reference location when the driver is driving to the reference location.

The distance between the driver and the reference location may be compared with a threshold distance. The threshold distance may be set by the driver or the service provider of the car hailing service. The threshold distance may be 5 m, 10 m, 20 m, 50 m, 100 m, 200 m, or any other values. According to the comparison result, the mobile device may determine the status of the driver. For example, if the distance between the driver and the reference location is greater than the threshold distance, the driver may be determined to be in a first status, i.e. far from the reference location. Otherwise, the driver may be determined to be in a second status, i.e. close to the reference location.

Upon determining that the driver is close to the reference location (e.g. the driver changes from the first status to the second status), the mobile device may perform a first predetermined action. The first predetermined action may include notifying the driver by vibration, light and/or sound. The amplitude or frequency of vibration, the intensity and color of light and/or the loudness and frequency of sound may vary based on the distance between the driver and the reference location. More particularly, the amplitude or frequency of vibration, the intensity and color of light and/or the loudness and frequency of sound may be inversely proportional to the distance. The first predetermined action may also include changing from displaying a map under a plan view to a perspective view. Additionally, the first predetermined action may further include displaying and highlighting recommendation information around the reference location on the map. The recommendation information may include information about buildings, sceneries, streets, stations, rivers, mountains, etc. around the reference location. Different information may be displayed in different colors and formats on the mobile device. Merely by way of example, buildings may be displayed in red rectangles and mountains may be displayed in blue triangles.

When the driver picks up the passenger or when the mobile device determines that the driver is far from the reference location (e.g. the driver changes from the second status to the first status), the mobile device may perform a second predetermined action. In some embodiments, the second predetermined action may be different from the first predetermined action. For example, the second predetermined action may include changing from displaying the map under a perspective view to a plan view, stopping the notifications, and stopping displaying and highlighting recommendation information. The second predetermined action may also include displaying a route from the reference location or the location where the passenger is picked up to the destination.

Example 2

Similar to example 1, a driver may accept a car hailing service request from a passenger and the driver's mobile device may obtain a route from the driver's current location to the reference location. However, the driver may want to go to another place (e.g. gas station, restaurant, etc.) before picking up the passenger. Therefore parameters besides the distance may be required to evaluate whether the driver is ready to pick up the passenger when he is close to the reference location. The parameters may include but are not limited to direction, speed, acceleration, route, etc.

Taking speed as an example, the mobile device may obtain both the speed of the driver and the distance between the driver's location and the reference location. The distance between the driver and the reference location may be compared with a threshold distance, and the speed may be compared with a threshold speed. The threshold distance may be 5 m, 10 m, 20 m, 50 m, 100 m, 200 m, or any other values. The threshold speed may be 5 km/h, 8 km/h, 10 km/h, 15 km/h, 20 km/h, or any other values. According to the comparison result, the mobile device may determine the status of the driver. In some embodiments, the mobile device may not record the speed of the driver at traffic lights and may not compare it with the threshold speed.

For example, if the distance between the driver and the reference location is greater than the threshold distance, the driver may be determined to be in a first status, i.e. far from the reference location and not ready to pick up the passenger. If the distance between the driver and the reference location is less than the threshold distance and the speed of the driver is greater than the threshold speed, the driver may be determined to be in a second status, i.e. close to the reference location but not ready to pick up the passenger. If the distance between the driver and the reference location is less than the threshold distance and the speed of the driver is less than the threshold speed, the driver may be determined to be in a third status, i.e. close to the reference location and ready to pick up the passenger.

Upon determining that the driver is close to the reference location and ready to pick up the passenger (e.g. the driver changes from the first status or the second status to the third status), the mobile device may perform a first predetermined action. The first predetermined action may be similar to those described in Example 1 and is not repeated here.

When the driver picks up the passenger or when the mobile device determines that the driver is far from the reference location (e.g. the driver changes from the third status to the first status) the mobile device may perform a second predetermined action. The second predetermined action may be similar to those described in Example 1 and is not repeated here.

Example 3

On the basis of Example 2, after obtaining the speed of the driver and the distance between the driver's location and the reference location, the mobile device may calculate the time required to arrive at the reference location based on the speed and the distance. Alternatively, the required time may be obtained based on the distance and an average speed of the driver or a preset speed corresponding to the type of road. For example, the preset speed may be 100 km/h in highways and 60 km/h in city roads. An estimated arrival time may further be obtained based on the required time and the current time. Instead of comparing the speed and distance with the threshold values, the mobile device may compare the required time with a threshold time. The threshold time may be 1 min, 2 min, 5 min, 10 min, 15 min, 20 min, 30 min, or any other values. Based on the comparison result, the mobile device may determine the status of the driver. For example, if the required time or arrival time is greater than the threshold time, the driver may be determined to be in a first status, i.e. still on his way. Otherwise, the driver may be determined to be in a second status, i.e. arriving soon.

Upon determining that the driver arrives at the reference location soon (e.g. the driver changes from the first status or the second status to the third status), the mobile device may perform a first predetermined action. The first predetermined action may be similar to those described in Example 1 and is not repeated here. When the driver picks up the passenger the mobile device may perform a second predetermined action. The second predetermined action may be similar to those described in Example 1 and is not repeated here.

Example 4

In a car hailing service, a passenger may have a mobile device that implements the methods disclosed in present application. At first, the passenger may send a service request to a driver via the mobile device. The service request may include a current location (also referred to as a reference location) of the passenger and a destination. Once the driver accepts the service request, the mobile device may obtain the current location of the driver and display a route from the driver's current location to the reference location. The mobile device may continuously or periodically update and display the driver's current location on the mobile device. The mobile device may also obtain the distance between the driver and the reference location. The mobile device may also obtain the required time and display it to the passenger. The method of obtaining required time and time of arrival may be similar to those described in example 3 and is not repeated. In some embodiments, the mobile device of the passenger may also obtain a speed, an acceleration, a direction, etc.

The distance between the driver and the reference location may be compared with a threshold distance. The threshold distance may be 5 m, 10 m, 20 m, 50 m, 100 m, 200 m, or any other values. According to the comparison result, the mobile device may determine the status of the driver. For example, if the distance between the driver and the reference location is greater than the threshold distance, the driver may be determined to be in a first status, i.e. far from the reference location. Otherwise, the driver may be determined to be in a second status, i.e. close to the reference location.

Upon determining that the driver is close to the reference location (e.g. the driver changes from the first status to the second status), the mobile device may perform a first predetermined action. The first predetermined action may include notifying the passenger by vibration, light and/or sound. After receiving the notification, the passenger may go outside and wait the driver. The amplitude and frequency of vibration, the intensity and color of light and/or the loudness and frequency of sound may vary based on the distance between the driver and the reference location. More particularly, the amplitude or frequency of vibration, the intensity and color of light and/or the loudness and frequency of sound may be inversely proportional to the distance.

When the passenger is picked up, the notification of the mobile device (e.g. vibration, light, and/or sound) may be stopped. The mobile device may also display a route from the reference location or the location where the passenger is picked up to the destination.

Example 5

In a car hailing service, after a passenger is picked up, a driver's mobile device may display a route from the pick-up location to the destination. The mobile device may continuously or periodically obtain the distance between the driver and the destination when the driver is driving to the destination. Additionally, the mobile device may also obtain a speed, an acceleration, a direction, a required time, an arrival time, etc.

Taking distance as an example, the mobile device may compare the distance between the driver and the destination with a threshold distance. According to the comparison result, the mobile device may determine the status of the driver. For example, if the distance between the driver and the destination is greater than the threshold distance, the driver may be determined to be in a first status, i.e. far from the destination. Otherwise, the driver may be determined to be in a second status, i.e. close to the destination.

Upon determining that the driver is close to the destination (e.g. the driver changes from the first status to the second status), the mobile device may perform a first predetermined action. The first predetermined action may be similar to those described in Example 1 and is not repeated here. When the driver arrives the destination or when the car hailing service request is completed, the mobile device may perform a second predetermined action. The second predetermined action may be similar to those described in Example 1 and is not repeated here.

It should be understood that the passenger's mobile device may implement similar or same process as the driver's device in Example 5. For example, the mobile device may display a map under a perspective view to the passenger when he is close to the destination.

In some embodiments, when the car hailing service request is completed, the mobile device may display the recommendation information around the destination to the passenger. The recommendation information may include information about buildings, sceneries, streets, stations, rivers, mountains, etc. Different information may be displayed in different colors and formats on the mobile device. If the passenger chooses any of the buildings, sceneries, streets, stations, rivers, mountains, etc., its detailed information and/or picture may be provided to the passenger. A route (e.g. a walking route) from the destination to the chosen place may also be displayed to the passenger.

Example 6

During a journey, a driver may have a mobile device that implements the methods disclosed in present application. At first, the driver may input a destination of the journey (e.g. yellow stone national park or a particular region thereof) to the mobile device. The mobile device may obtain a current location of the driver and display a route from the current location of the driver to the destination. The mobile device may continuously or periodically obtain speed of the driver and the distance between the current location of the driver and the destination.

Similar to Example 2, the mobile device may compare the speed and distance with a threshold speed and a threshold distance. Based on the comparison result, the mobile device may determine the status of the driver. For example, if the distance between the driver and the destination is greater than the threshold distance, the driver is determined to be in a first status, i.e. far from the destination. If the distance between the driver and the destination is less than the threshold distance and the speed is greater than the threshold speed, the driver is determined to be in a second status, i.e. close to the destination but not ready to park. For example, a second status may occur in a situation that the driver arrives at his destination (e.g. yellow stone nation park), but the sceneries nearby are not what he likes. If the distance between the driver and the destination is less than the threshold distance and the speed is less than the threshold speed, the driver is determined to be in a third status, i.e. close to the destination and ready to park.

Upon determining that the driver changes from the first status to the second status (e.g. the driver is close to the destination), the mobile device may notify the driver by vibration, light or sound. The method of notification may be similar to those disclosed in Example 1 and is not repeated here. Upon determining that the driver changes from the second status to the third status (e.g. the driver wants to park), the mobile device may change from displaying a map under a plan view to a perspective view. The mobile device may also display and highlight recommendation information around the destination or the current location on the map.

It should be understood that the mobile device may change the view of map and/or display and highlight the recommendation information upon determining that the driver changes from the first status to the second status. It should also be understood that the mobile device may notify the driver, change the view of map and/or display and highlight the recommendation information upon determining that the driver changes directly from the first status to the third status.

Example 7

The method disclosed in Examples 1-4 may be applied in an item/food delivery service. For example, a customer may be notified when the delivery man arrives or are arriving and may then collect the food without waiting outside. Therefore, the waiting time of both the customer and the delivery man are reduced and the whole service becomes smooth and easy.

Example 8

The method disclosed in Examples 1-5 may be applied in a hitchhiking service. For example, a driver may pick up multiple passengers at multiple reference locations and deliver them to multiple destinations respectively. The mobile device of the driver may repeatedly perform the process disclosed in Examples 1-5 when he pick up or deliver each of the passengers. The mobile device may also generate multiple routes based on the reference locations and destinations.

Example 9

The method disclosed in Examples 1-8 may be applied to people taking different transportation means, including but not limiting to buses, bikes, trains, cars, planes, underground, etc. For example, when a bike rider arrives at his destination, his mobile device may display information about a parking lot nearby. For another example, a person taking underground may be notified by his mobile device when he is close to a destination or an interchange station.

Example 10

A server (or remote processor) may communicate with a mobile device of a driver and/or a mobile device of a passenger via a wireless network. The server may generate instructions. The instructions may be transmitted to a mobile device of a driver and/or a mobile device of a passenger to make the mobile device(s) implement processes disclosed in Examples 1-6. For example, the server may send an instruction of displaying a map to the mobile device, and the mobile device may then display the map to the driver or passenger. Also, part or all operations of the processes disclosed in Examples 1-6 may be performed by the server. For example, the server or remote processor may obtain the location of the driver and passenger and may calculate the distance between the driver and the passenger (or the distance between the driver and the reference location). The calculated distance may then be sent to the driver and/or passenger. For another example, the server may generate a route from the driver to the reference location and send the route to the driver's or passenger's mobile device. Then the route may be displayed to the driver or passenger respectively.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system to determine an operation status of an electronic device, comprising an electronic device, the electronic device including:
    a circuit configured to receive a location of the system from a positioning system;
    a display to display location information of the system;
    a bus;
    at least one storage medium connected to the bus and including a set of instructions for switching operation mode based on status change; and
    logic circuits in communication with the at least one storage medium via the bus, wherein when executing the set of instructions, the logic circuits are directed to:
        obtain first electronic signals encoding location information associated with the electronic device with respect to a reference location, wherein the location information includes a distance between a current location and the reference location and a speed of the electronic device;
        obtain an estimated required time to get the reference location based on the distance and the speed of the electronic device;
        determine whether a status of the electronic device changes from a first status to a second status based on one or more threshold required times and the estimated required time; and
        upon determining that the status of the electronic device changes from the first status to the second status, perform a predetermined action.

2. The system of claim 1, wherein the status of the electronic device further includes a distance between the electronic device and the reference location;
    the first status includes the distance being longer than a threshold distance; and
    the second status includes the distance being shorter than the threshold distance.

3. The system of claim 1, wherein the status of the electronic device further includes a distance between the electronic device and the reference location;
    the first status includes the distance being shorter than a threshold distance; and
    the second status includes the distance being longer than the threshold distance.

4. The system of claim 1, wherein the status of the electronic device further includes a speed of the electronic device;
    the first status includes the speed being slower than a threshold speed; and
    the second status includes the speed being faster than the threshold speed.

5. The system of claim 1, wherein the status of the electronic device further includes a speed of the electronic device;
    the first status includes the speed being faster than a threshold speed; and
    the second status includes the speed being slower than the threshold speed.

6. The system of claim 1, wherein the electronic device is further configured to display a map under a plan view;
    the predetermined action includes changing from displaying the map under the plan view to displaying the map under a perspective view.

7. The system of claim 1, wherein the electronic device is further configured to display a map under a perspective view;
    the predetermined action includes changing from displaying the map under the perspective view to displaying the map under a plan view.

8. The system of claim 1, wherein the electronic device is further configured to display a map;
    the predetermined action includes:
        obtaining second electronic signals encoding recommendation information around the reference location, and
        displaying and highlighting the recommendation information on the map.

9. The system of claim 8, wherein the recommendation information is one or more locations along a route between the current location and the reference location or around the reference location, and wherein the electronic device is further configured to
    rank the one or more locations based on one or more ranking criteria; and
    display the recommendation information of the one or more locations based on the ranking result.

10. The system of claim 1, wherein the electronic device is further configured to generate a vibration;
    wherein the predetermined action includes changing frequency of the vibration.

11. A method to determine an operation status of an electronic device, comprising:
    obtaining, by the electronic device, first electronic signals encoding location information associated with the electronic device with respect to a reference location, wherein the location information includes a distance between a current location and the reference location and a speed of the electronic device;

obtaining, by the electronic device, an estimated required time to get the reference location based on the distance and the speed of the electronic device;

determining, by the electronic device, whether a status of the electronic device changes from a first status to a second status based on one or more threshold required times and the estimated required time; and upon determining that the status of the electronic device changes from the first status to the second status, performing, by the electronic device, a predetermined action.

12. The method of claim 11, wherein the status of the electronic device further includes a distance between the electronic device and the reference location;

the first status includes the distance being longer than a threshold distance; and the second status includes the distance being shorter than the threshold distance.

13. The method of claim 11, wherein the status of the electronic device further includes a distance between the electronic device and the reference location;

the first status includes the distance being shorter than a threshold distance; and the second status includes the distance being longer than the threshold distance.

14. The method of claim 11, wherein the status of the electronic device further includes a speed of the electronic device;

the first status includes the speed being slower than a threshold speed; and the second status includes the speed being faster than the threshold speed.

15. The method of claim 11, wherein the status of the electronic device further includes a speed of the electronic device;

the first status includes the speed being faster than a threshold speed; and the second status includes the speed being slower than the threshold speed.

16. The method of claim 11, further comprising displaying, by the electronic device, a map under a plan view;

the predetermined action includes changing from displaying the map under the plan view to displaying the map under a perspective view.

17. The method of claim 11, further comprising displaying, by the electronic device, a map under a perspective view;

the predetermined action includes changing from displaying the map under the perspective view to displaying the map under a plan view.

18. The method of claim 11, further comprising displaying, by the electronic device, a map;

the predetermined action includes:

obtaining second electronic signals encoding recommendation information around the reference location, and displaying and highlighting the recommendation information on the map.

19. The method of claim 11, wherein the electronic device is a mobile device associated with a passenger waiting for a vehicle driver, and the reference location is associated with the vehicle driver moving towards the passenger.

20. A non-transitory computer readable medium, comprising executable instructions that, when executed by an electronic device, directs the electronic device to perform actions of:

obtaining electronic signals encoding location information associated with the electronic device with respect to a reference location, wherein the location information includes a distance between a current location and the reference location and a speed of the electronic device;

obtaining an estimated required time to get the reference location based on the distance and the speed of the electronic device;

determining whether a status of the electronic device changes from a first status to a second status based on one or more threshold required times and the estimated required time; and upon determining that the status of the electronic device changes from the first status to the second status, performing a predetermined action.

* * * * *